United States Patent Office 2,937,116
Patented May 17, 1960

2,937,116
THERAPEUTIC COMPOSITION INCLUDING ACETYLATION INHIBITOR

Willard Johnson, Montreal, Quebec, Canada, assignor to Frank W. Horner Limited, Montreal, Quebec, Canada No Drawing. Application February 11, 1957
Serial No. 639,240

Claims priority, application Canada June 4, 1954

4 Claims. (Cl. 167—51.5)

This invention relates to a therapeutic composition and more particularly to a therapeutic composition including sulfanilamide or a therapeutically effective derivative thereof and an acetylation inhibitor.

Acetylation is the most important type of metabolic change undergone by sulfanilamide and its derivatives in the human or animal body. The rate and extent of acetylation varies with different compounds and animal species. Acetylated sulfonamides are almost completely inactive therapeutically and are usually far more toxic than the parent compound.

Sulfanilamide and its derivatives are excreted via the kidney mainly in the acetylated form due to the fact that the acetyl derivatives are not reabsorbed by the kidney tubules as are the parent compounds to a large extent.

The inactivation and loss of free sulfonamides by acetylation and subsequent excretion necessitates the administration of frequent doses of the drugs in order to maintain the blood concentration of the free sulfonamides at therapeutic levels, added to which is the danger of kidney damage due to the blocking of kidney tubules by crystalline acetylsulfonamide.

It has been found that the acetylation of the sulfonamides can be inhibited by administering with the sulfonamides a substance which will compete with the sulfonamides for the acetylating enzyme. The inhibition thus caused tends to reduce the danger of kidney damage and, by reducing the rate of urinary excretion makes possible the maintenance of therapeutic blood levels of free sulfonamide at lower dosage levels and with less frequent administration than has hitherto been the case.

An acetylation inhibitor will be beneficial with any of the therapeutically effective sulfonamides including sulfanilamide, sulfathiazole, sulfamerazine, sulfamethazine, sulfadiazine and the derivatives such as the sodium salts thereof.

The general classes of compounds which have been found to be effective in inhibiting acetylation of the sulfonamides are non-toxic ring compounds such as aromatic or heterocyclic compounds having as their active groups one of more amino, amido, hydrazino, carboxamide, thiocarboxamide, carboxyhydrazide or thiocarboxyhydrazide groups. Other substituents in the ring may modify the activity of these active groups.

More particularly the suitable compounds can be defined as having the formula:

R—A—X where R is at least one member selected from the group consisting of hydrogen, a halogen such as bromine, hydroxyl, substituted hydroxyl such as alkoxy having not more than 3 carbon atoms, amino, substituted amino such as alkyl substituted amino, phenyl, substituted phenyl such as alkyl substituted phenyl, carboxyl and substituted carboxyl such as alkyl substituted carboxyl; where A is selected from the group consisting of aromatic and heterocyclic rings; and where X is at least one member selected from the group consisting of amino, amido, hydrazino, carboxamide, thiocarboxyamide, carboxyhydrazide and thiocarboxyhydrazide.

The compounds which are suitable should be soluble so as to be available for competitive inhibition of sulfonamide acetylation and desirably should have soluble acetylated derivatives in the case of those inhibitors which are themselves acetylated so that they can readily be excreted from the body. The suitable compounds have been described as non-toxic by which is meant that the compounds including acetylated derivatives formed should not be unduly toxic in the dosages employed. Many of the compounds in the general group referred to are toxic to some extent, particularly if used in too large dosages.

The following compounds have been found to be particularly effective as acetylation inhibitors; 5-bromosalicylamide, p-hydroxybenzoic acid hydrazide, salicylic acid hydrazide, p-aminosalicylic acid hydrazide, isonicotinic acid hydrazide, salicylic acid amide and para-aminosalicylic acid and salts thereof.

While this invention is primarily contemplated as being applicable to the inhibition of the acetylation of sulfonamides, it has been found that it is applicable to other therapeutic compounds which become acetylated in the body to products which are less therapeutically effective and which tend to be excreted. Thus, the acetylation inhibitors contemplated by this invention can be used to inhibit the acetylation of isoniazid. 5-bromosalicylamide at a concentration of $1.3 \times 10^{-4}$ M/l. (moles per litre) gave a 52% inhibition of the acetylation of isoniazid when the latter was present at a concentration of $9 \times 10^{-4}$ M/l. in a pigeon liver extract system; sodium para-aminosalicylate at a concentration of $9 \times 10^{-4}$ M/l. gave a 41% inhibition. Similar results were obtained in tests with rabbits at isoniazid/PAS ratios of 1/10 and 1/12.

The results of two experiments shown in Table I illustrate the preponderance of the acetyl derivative of sulfamethazine in the urinary excretion of the drug. In Experiment 1, sulfamethazine was administered to rabbits by stomach tube, and the total 24 hour urine was assayed for free and acetylated sulfamethazine. It was found that more than 80% of the sulfamethazine in the 24 hour urine sample was acetylated, while the excretion of free sulfamethazine was negligible (Table I, Experiment 1). In Experiment 2, six rabbits were given an initial dose of 500 mg. of sulfamethazine, followed by three daily doses of 200 mg. The average daily excretion of sulfamethazine is shown in Experiment 2, Table I. Here, again, it will be seen that over 80% of urinary sulfamethazine appeared in the acetylated form.

TABLE I

*The urinary output of sulfamethazine (SMMD) from rabbits after oral administration*

| Experiment No. | No. of Rabbits | Dosage (g./kg. body wt.) | Dose (mg.) | SMMD Excreted (24 hr. urine) | | | Percent of Total SMMD Excreted as Acetyl Derivative |
|---|---|---|---|---|---|---|---|
| | | | | Total (mg.) | Free (mg.) | Acetylated (mg.) | |
| 1 | 3 | 0.1 | 208 | 107 | 18 | 89 | 83 |
| | 3 | 0.25 | 591 | 190 | 26 | 164 | 86 |
| 2 | 6 | (*) | | 146 | 21 | 125 | 86 |

*Initial dose 600 mg. followed by 3 daily doses of 200 mg.
Mean values for the group are shown.
Average daily excretion shown.

The ability of various drugs to inhibit the acetylation of sulfonamides was ascertained in a pigeon liver acetylating system.

Cell-free extracts of acetone-dried pigeon liver, containing the acetylating enzymes in soluble form, when incubated in the presence of sulfanilamide under the proper experimental conditions are capable of a high rate of acetylation. For instance, upon the addition of 410 micrograms of sulfanilamide to the system, it was found that 88% of the sulfanilamide was acetylated in a period of two hours. The addition of certain types of compounds to the system brings about a marked inhibition of the rate of acetylation.

Table II shows the percentage inhibition of sulfanilamide acetylation caused by the compounds contemplated by this invention at the molar concentrations shown. The sulfanilamide concentration in each case was $7.7 \times 10^{-4}$ M/l.

It will be noted that 5-bromosalicylamide is particularly effective as an inhibitor. 6-amino nicotinic acid amide though fairly effective is too toxic for practical use.

Drugs which inhibited the acetylation of sulfanilamide by the pigeon liver system were administered to rabbits and rats along with sulfanilamide or a derivative of sulfanilamide to ascertain their inhibitory effects on acetylation in vivo as exemplified mainly by their ability to maintain the free sulfonamide blood levels above that of control animals to which the same dose of sulfonamide was given but no acetylation inhibitor. In some experiments the blood levels of sulfonamide in individual rabbits were determined in the presence and absence of an acetylation inhibitor, in which case the rabbits were acting as their own controls.

TABLE II

*Inhibition of sulfanilamide acetylation in pigeon liver extracts*

| Acetylation Inhibitor | Concentration of Inhibitor, M./l. | Inhibition of Acetylation, percent |
|---|---|---|
| Para-aminosalicylic acid hydrazide | $3.3 \times 10^{-4}$ | 53 |
| Do | $5 \times 10^{-4}$ | 74 |
| Do | $10^{-3}$ | 100 |
| Salicylic acid hydrazide | $5 \times 10^{-4}$ | 45 |
| Do | $10^{-3}$ | 99 |
| Isonicotinic acid hydrazide | $5 \times 10^{-4}$ | 41 |
| Do | $10^{-3}$ | 53 |
| Nicotinic acid hydrazide | $5 \times 10^{-4}$ | 18 |
| Do | $10^{-3}$ | 30 |
| Benzoic acid hydrazide | $5 \times 10^{-4}$ | 21 |
| Do | $10^{-3}$ | 43 |
| Salicylic acid amide | $5 \times 10^{-4}$ | 47 |
| Do | $10^{-3}$ | 66 |
| Para-aminosalicylate | $5 \times 10^{-4}$ | 31 |
| Do | $10^{-3}$ | 42 |
| 6-Amino Nicotinic acid amide | $5 \times 10^{-4}$ | 30 |
| Do | $10^{-3}$ | 48 |
| Nicotinic acid amide | $2 \times 10^{-2}$ | 40 |
| Do | $4 \times 10^{-2}$ | 57 |
| Isonicotinic acid amide | $2 \times 10^{-2}$ | 10 |
| Do | $4 \times 10^{-2}$ | 27 |
| 5-Bromosalicylamide | $10^{-4}$ | 50 |
| Do | $2 \times 10^{-4}$ | 67 |
| Do | $3 \times 10^{-4}$ | 73 |
| p-Hydroxybenzoic acid hydrazide | $5 \times 10^{-4}$ | 44 |
| Do | $10^{-3}$ | 62 |
| Pyrazinamide | $3 \times 10^{-1}$ | 17 |

TABLE III

*Effect of para-aminosalicylic acid hydrazide (PASH) on the blood levels of sulfanilamide in rabbits following a single oral dose*

| Experiment | No. of Animals | Drug Dose | Blood levels of Sulfanilamide* (mg. Percent) | | | | | |
|---|---|---|---|---|---|---|---|---|
| | | | 2 hours | | 4 hours | | 6 hours | |
| | | | Free | Acet. | Free | Acet. | Free | Acet. |
| 1 | 3 | sulfanilamide 400 mg | 8.8 | 6.6 | 4.5 | 8.7 | 1.4 | 6.5 |
| | 3 | sulfanilamide 400 mg / PASH 200 mg | 10.9 | 4.3 | 7.0 | 5.3 | 4.4 | 4.5 |

| Experiment | No. of Animals | Drug Dose | Blood levels of Sulfanilamide* (mg. Percent) | | | |
|---|---|---|---|---|---|---|
| | | | 2½ hours | | 5 hours | |
| | | | Free | Acet. | Free | Acet. |
| Group: 2A | 2 | sulfanilamide 600 mg | 5.5 | 7.2 | 1.7 | 5.7 |
| B | 2 | sulfanilamide 600 mg / PASH 500 mg | 10.1 | 6.3 | 3.9 | 6.9 |
| 3B | 2 | sulfanilamide 600 mg | 5.4 | 10.5 | | |
| A | 2 | sulfanilamide 600 mg / PASH 500 mg | 10.5 | 5.3 | 5.4 | 5.0 |

*Mean values for the group are shown.
Drugs were administered by stomach tube as a suspension in tap water.
Sulfanilamide dosage: 200 mg./kg. body wt. All rabbits were approximately equal in weight.

Table III shows the results of three experiments in which para-aminosalicylic acid hydrazide (PASH) was tested for its effect on sulfanilamide blood levels in rabbits. In Experiment 1 (Table III) PASH was administered at half the dosage of sulfanilamide. The results show that the mean blood level of free sulfanilamide in the rabbits given PASH was elevated above that of the controls at 2, 4 and 6 hour intervals following drug administration, and concomitantly the blood level of acetylated sulfanilamide was below that of the controls. The most striking effect of PASH is shown at the 6 hour interval, when the blood level of free sulfanilamide in the group receiving PASH was more than 300% of the control level. In Experiments 2 and 3 (Table III) larger animals were used than in Experiment 1, hence the higher drug dose. Group A, which served as controls in Experiment 2, were used as experimental animals in Experiment 3. The results obtained in Experiment 2 confirm those of the previous experiment. Five hours after the administration of sulfanilamide and PASH combined, the mean blood level of free sulfanilamide was more than 200% of the control blood level. Furthermore, comparing the blood levels of free sulfanilamide of Group A in Experiment 2 (Table III) with Group A in Experiment 3, it will be seen that in the same rabbits the administration of PASH along with sulfonamide was instrumental in doubling the blood level of free sulfonamide at the 2½ hour interval, while at the end of 5 hours the free sulfa blood level was more than 200% greater than was the case when sulfanilamide was given alone.

The results of an experiment in which rats were used ts the test animals are shown in Table IV. Eight rats of equal weight were divided into two groups of four. The rats of one group were given, by stomach tube, 80 mg. of sulfanilamide each; the rats of the second group received, in addition to the sulfanilamide, 80 mg. of PASH each. Five hours after drug administration the animals were sacrificed and blood levels of free and acetylated sulfanilamide determined. The mean blood level of free sulfanilamide in the rats given PASH was 30% above the control level. No acetylated sulfanilamide was found in the experimental group, as compared with 2.2 mg. percent in the control group. It is well known that rats are poor acetylators of aromatic amines as compared with rabbits. Hence, the inhibition of acetylation is not likely to produce a large difference in the blood level of free sulfanilamide. The point of greatest significance in this experiment was the complete absence of acetylsulfanilamide when PASH was given.

TABLE IV

*The effect of para-aminosalicylic acid hydrazide (PASH) on sulfanilamide blood levels in rats*

| No. of Animals | Drug Dose* | Sulfanilamide blood levels after 5 hours (mg. percent) | |
|---|---|---|---|
| | | Free | Acetylated |
| 4 | 80 mg. sulfanilamide | 8.5 | 2.2 |
| 4 | {80 mg. sulfanilamide / 80 mg. PASH} | 11.5 | nil |

*Drugs were given orally as a suspension in 10% gum acacia. Five hours after drug administration the animals were sacrificed, and sulfanilamide blood levels were determined.

In Table V the results are shown of an experiment in which p-(n-dipropylsulfamyl)-benzoic acid was included to retard the renal elimination of p-aminosalicylate (PAS) so as to retain the PAS as an inhibiting agent. It was verified in a separate experiment that p-(n-dipropylsulfamyl)-benzoic acid when used without an acetylation inhibitor had no inhibitory effect on the acetylation of sulfanilamide by pigeon liver extracts.

TABLE V

*Effect of p-aminosalicylate (PAS) and p-(n-dipropylsulfamyl)-benzoic acid on the blood levels of a triple sulfapyrimidine mixture in rabbits*

| No. of Animals | Drug Dose [1] | Triple Sulfa Mixture Blood Levels [2] (mg. Percent) | | | |
|---|---|---|---|---|---|
| | | 3 hours | | 6 hours | |
| | | Free | Acet. | Free | Acet. |
| 3 | 750 mg. triple sulfa mixture. | 6.6 | 5.9 | 2.7 | 2.1 |
| 3 | {750 mg. triple sulfa / 1 gm. PAS, 200 mg. p-(n-dipropylsulfamyl)-benzoic acid} | 14.4 | 9.1 | 6.6 | 8.5 |

[1] 750 mg. triple sulfa mixture—250 mg. each of sulfadiazine, sulfamerazine, and sulfamethazine. All drugs were administered by mouth as a suspension of tap water.
[2] Mean values of 3 animals in each group.

This application is a continuation-in-part of copending application Serial No. 452,227, filed August 25, 1954, and now abandoned.

I claim:

1. A therapeutic composition comprising: (1) a therapeutically active sulfonamide; and (2) a competitive acetylation inhibitor consisting of a non-sulfonamide soluble compound having the formula R—A—X where R is at least one member selected from the group consisting of hydrogen, a halogen, hydroxyl, amino, lower alkyl radicals having not more than three carbon atoms, phenyl, and carboxyl; where A is selected from the group consisting of aromatic and heterocyclic rings; and where X is at least one member selected from the group consisting of amino, amido, carboxamide, thiocarboxamide, carboxyhydrazide, and thiocarboxyhydrazide, said competitive acetylation inhibitor being convertible by enzyme action to a soluble acetylated derivative and said sulfonamide and said compound of the formula R—A—X each being present in non-toxic amounts.

2. In a therapeutic composition including a therapeutically active sulfonamide, a competitive acetylation inhibitor consisting of 5-bromosalicylamide, said sulfonamide and competitive acetylation inhibitor each being present in non-toxic amounts.

3. In a therapeutic composition including a therapeutically active sulfonamide, a competitive acetylation inhibitor consisting of p-aminosalicylic acid hydrazide, said sulfonamide and competitive acetylation inhibitor each being present in non-toxic amounts 4. In a therapeutic composition including a therapeutically active sulfonamide, a competitive acetylation inhibitor p-amino salicylic acid, said sulfonamide and competitive acetylation inhibitor each being present in non-toxic amounts.

References Cited in the file of this patent

UNITED STATES PATENTS 2,721,827    Gustus    Oct. 25, 1955

OTHER REFERENCES

Hayman: Amer. J. Pharmacy, February 1950, vol. 122, No. 2, pp. 72–74.

Indian Med. Gazette Advertiser, February 1953, p. 7 (Adv.).

Schwartz et al.: Trans. 12th. Conf. on Chemotherapy of Tuberculosis, February 1953, pp. 296–298.

J.A.M.A., vol. 154, No. 1, Jan. 2, 1954, pp. 52–59.

Rubin: Ann. Int. Med., vol. 40, No. 3, March 1954, pp. 493–500.